United States Patent [19]

Walker

[11] Patent Number: 4,664,816

[45] Date of Patent: May 12, 1987

[54] ENCAPSULATED WATER ABSORBENT POLYMERS AS LOST CIRCULATION ADDITIVES FOR AQUEOUS DRILLING FLUIDS

[75] Inventor: Clarence O. Walker, Richmond, Tex.

[73] Assignee: Texaco Inc., White Plains, N.Y.

[21] Appl. No.: 737,992

[22] Filed: May 28, 1985

[51] Int. Cl.$^4$ ................................................ C09K 7/02
[52] U.S. Cl. .............................. 252/8.512; 252/8.51; 175/72
[58] Field of Search ........................ 252/8.5 LC, 8.5 C; 175/72; 428/402.24, 327, 403, 484; 427/213.3; 524/489; 523/207, 210

[56] References Cited

U.S. PATENT DOCUMENTS

| | | | |
|---|---|---|---|
| 2,634,098 | 4/1953 | Armentrout | 175/72 |
| 2,650,195 | 8/1953 | Cardwell et al. | 252/8.5 LC |
| 2,778,604 | 1/1957 | Reistle | 175/72 |
| 2,836,555 | 5/1958 | Armentrout | 252/8.5 |
| 2,856,354 | 10/1958 | Armentrout | 252/8.5 LC |
| 2,890,169 | 6/1959 | Prokop | 252/8.5 |
| 2,935,472 | 5/1960 | Klaas et al. | 252/8.5 LC |
| 3,078,920 | 2/1963 | ten Brink | 166/33 |
| 3,082,823 | 3/1963 | Hower | 166/29 |
| 3,150,726 | 9/1964 | Bodine et al. | 175/72 |
| 3,448,800 | 6/1969 | Parker et al. | 166/294 |
| 3,878,175 | 4/1975 | Steckler et al. | 260/78.5 |
| 3,909,421 | 9/1975 | Gaddis | 252/8.55 |
| 3,971,852 | 7/1976 | Brenner et al. | 426/103 |
| 4,036,301 | 7/1977 | Powers et al. | 166/293 |
| 4,042,529 | 8/1977 | Nimerick et al. | 252/8.55 R |
| 4,078,612 | 3/1978 | Gallus | 166/299 |
| 4,124,748 | 11/1978 | Fujimoto et al. | 526/8 |
| 4,128,528 | 12/1978 | Frisque et al. | 260/42.55 |
| 4,182,677 | 1/1980 | Bocard et al. | 210/36 |
| 4,261,422 | 4/1981 | White et al. | 166/305 |
| 4,269,279 | 5/1981 | House | 175/66 |
| 4,320,040 | 3/1982 | Fujita et al. | 524/459 |
| 4,362,566 | 12/1982 | Hinterwaldner | 106/85 |
| 4,391,925 | 7/1983 | Mintz et al. | 523/130 |
| 4,442,241 | 4/1984 | Drake et al. | 523/130 |
| 4,445,576 | 5/1984 | Drake et al. | 166/291 |
| 4,475,594 | 10/1984 | Drake et al. | 166/294 |
| 4,498,995 | 2/1985 | Gockel | 252/8.5 |
| 4,503,170 | 3/1985 | Drake et al. | 523/130 |
| 4,535,098 | 8/1985 | Evani et al. | 252/194 |

*Primary Examiner*—Herbert B. Guynn
*Assistant Examiner*—J. E. Thomas
*Attorney, Agent, or Firm*—Jack H. Park; Kenneth R. Priem; Harold J. Delhommer

[57] ABSTRACT

The disclosed invention is a novel drilling fluid additive for use in reducing lost circulation in wellbores and a method for employing the invention additive for reducing such lost circulation. The invention additive is a highly water absorbent polymer encapsulated by a reaction-preventive protective casing to prevent the polymer from expanding by absorbing water until it is desired to breach the casing. The reaction-preventive protective casing may be a film which will dissolve after a desired time of residence in the borehole or a film or waxy substance which will dissolve or melt at a desired temperature in the borehole, releasing the water absorbent polymer to expand by absorbing water. The substantially expanded polymer will seal off thief zones and fissures, reducing lost circulation.

18 Claims, No Drawings

ENCAPSULATED WATER ABSORBENT POLYMERS AS LOST CIRCULATION ADDITIVES FOR AQUEOUS DRILLING FLUIDS

BACKGROUND OF THE INVENTION

This invention is related to concurrently filed U.S. patent applications Ser. No. 738,000, filed May 28, 1985, Ser. No. 737,990, filed May 28, 1985, and Ser. No. 737,991, filed May 28, 1985.

The invention concerns novel additives for reducing lost circulation when aqueous drilling fluids are used and a method for reducing such lost circulation. More particularly, the lost circulation additives are encapsulated water absorbent polymers which will be unable to absorb water and expand to plug fissures and thief zones until absorption is desired.

Drilling fluids, or drilling muds as they are sometimes called, are slurries of clay solids used in the drilling of wells in the earth for the purpose of recovering hydrocarbons and other fluid materials. Drilling fluids have a number of functions, the most important of which are: lubricating the drilling tool and drill pipe which carries the tool, removing formation cuttings from the well, counterbalancing formation pressures to prevent the inflow of gas, oil or water from permeable rocks which may be encountered at various levels as drilling continues, and holding the cuttings in suspension in the event of a shutdown in the drilling and pumping of the drilling fluid.

For a drilling fluid to perform these functions and allow drilling to continue, the drilling fluid must stay in the borehole. Frequently, undesirable formation conditions are encountered in which substantial amounts or, in some cases, practically all of the drilling fluid may be lost to the formation. Drilling fluid can leave the borehole through large or small fissures or fractures in the formation or through pores in the rock matrix surrounding the borehole.

Most wells are drilled with the intent of forming a filter cake of varying thickness on the sides of the borehole. The primary purpose of the filter cake is to reduce the large losses of drilling fluid to the surrounding formation. Unfortunately, formation conditions are frequently encountered which may result in unacceptable losses of drilling fluid to the surrounding formation despite the type of drilling fluid employed and filter cake created.

A variety of different substances are now pumped down well bores in attempts to reduce the large losses of drilling fluid to fractures and the like in the surrounding formation. Different forms of cellulose are the preferred materials employed. Some substances which have been pumped into well bores to control lost circulation are: almond hulls, walnut hulls, bagasse, dried tumbleweed, paper, coarse and fine mica, and even pieces of rubber tires. These and other prior art additives are described in U.S. Pat. No. 4,498,995.

Another process that is employed to close off large lost circulation problems is referred to in the art as gunk squeeze. In the gunk squeeze process, a quantity of a powdered bentonite is mixed in diesel oil and pumped down the well bore. Water injection follows the bentonite and diesel oil. If mixed well, the water and bentonite will harden to form a gunky semi-solid mess, which will reduce lost circulation. Problems frequently occur in trying to adequately mix the bentonite and water in the well. The bentonite must also be kept dry until it reaches the desired point in the well. This method is disclosed in U.S. Pat. No. 3,082,823.

Many of the methods devised to control lost circulation involve the use of a water expandable clay such as bentonite which may be mixed with another ingredient to form a viscous paste or cement. U.S. Pat. No. 2,890,169 discloses a lost circulation fluid made by forming a slurry of bentonite and cement in oil. The slurry is mixed with a surfactant and water to form a composition comprising a water-in-oil emulsion having bentonite and cement dispersed in the continuous oil phase. As this composition is pumped down the wellbore, the oil expands and flocculates the bentonite which, under the right conditions, forms a filter cake on the wellbore surface in the lost circulation area. Hopefully, the filter cake will break the emulsion causing the emulsified water to react with the cement to form a solid coating on the filter cake. But such a complex process can easily go wrong.

U.S. Pat. No. 3,448,800 discloses another lost circulation method wherein a water soluble polymer is slurried in a nonaqueous medium and injected into a well. An aqueous slurry of a mineral material such as barite, cement or plaster of paris is subsequently injected into the well to mix with the first slurry to form a cement-like plug in the wellbore.

U.S. Pat. No. 4,261,422 describes the use of an expandable clay such as bentonite or montmorillonite which is dispersed in a liquid hydrocarbon for injection into the well. After injection, the bentonite or montmorillonite will expand upon contact with water in the formation. Thus, it is hoped that the expanding clay will close off water producing intervals but not harm oil producing intervals.

A similar method is disclosed in U.S. Pat. No. 3,078,920 which uses a solution of polymerized methacrylate dissolved in a nonaqueous solvent such as acetic acid, acetic anhydride, propionic acid and liquid aliphatic ketones such as acetone and methyl-ethyl ketone. The methacrylate will expand upon contact with formation water in the water producing intervals of the well.

It has also been proposed to mix bentonite with water in the presence of a water soluble polymer which will flocculate and congeal the clay to form a much stronger and stiffer cement-like plug than will form if bentonite is mixed with water. U.S. Pat. No. 3,909,421 discloses such a fluid made by blending a dry powdered polyacrylamide with bentonite followed by mixing the powder blend with water. U.S. Pat. No. 4,128,528 claims a powdered bentonite/polyacrylamide thickening composition prepared by mixing a water-in-oil emulsion with bentonite to form a powdered composition which rapidly becomes a viscous stiff material when mixed with water. U.S. Pat. Nos. 4,503,170; 4,475,594; 4,445,576; 4,442,241; and 4,391,925 teach the use of a water expandable clay dispersed in the oily phase of a water-in-oil emulsion containing a surfactant to stabilize the emulsion and a polymer dispersed in the aqueous phase. When the emulsion is sheared, it breaks and a bentonite paste is formed which hardens into a cement-like plug. The patent discloses the use of such polymers as polyacrylamide, polyethylene oxide and copolymers of acrylamide and acrylic or methacrylic acid.

U.S. Pat. No. 4,124,748 discloses a cross-linked copolymer of a vinyl ester and an ethylenically unsaturated carboxylic acid or derivative thereof that can absorb about 200 to 800% of its weight in water and expand substantially in volume when doing so. U.S. Pat. No. 4,124,748 also discloses the water absorbing capability of saponified products of starch-acrylonitrile graft copolymers.

Another highly water absorbent copolymer which expands upon water absorption is described in U.S. Pat. No. 4,320,040. The described compound is derived by polymerizing acrylic acid and/or methacrylic acid in the presence of polyvinyl alcohol followed by neutralization and a heat treatment.

Highly absorbent spongy polymer materials which may absorb large quantities of water and hydrocarbons causing an increase in volume are disclosed in U.S. Pat. No. 3,878,175. These are copolymers of an alkyl acrylate and a heterocyclic N-vinyl monomer containing a carbonyl functionality and a cross-linking agent in the presence of a hydrophobic liquid diluent. U.S. Pat. No. 4,182,677 discloses that natural and synthetic rubbers also swell in size upon absorbing water.

The last few years have witnessed a drastic increase in research on encapsulated products and methods to produce such products. This is particularly so in the pharmaceutical field. And it is now becoming recognized that encapsulation technology may be useful in many other fields.

U.S. Pat. No. 3,971,852 describes a process for encapsulating various fragrance oils such as oils with citrus and spice odors. The oils are encapsulated in a matrix comprised of polysaccharide and polyhydroxy compounds by converting an emulsion of the fragrance oil droplets in a solution of the matrix ingredients to an encapsulated solid state during a spray drying process. The patent also mentions that miscellaneous chemicals can be encapsulated by the invention method such as drilling fluids and waxes.

U.S. Pat. No. 4,269,279 discloses the use of plastic coated magnetic particles in a bead form to increase lubrication for drilling fluids. The encapsulated ferromagnetic particles can be recovered for reuse with a magnetic separator.

An encapsulated invention which has been disclosed for use in boreholes is described in U.S. Pat. No. 4,078,612. The patent describes an explodable material encapsulated in natural gums slurried in a liquid vehicle. The material is pumped into the formation around the wellbore and exploded to increase permeability.

The use of bentonite encapsulated within a water-insoluble polymeric coating has been disclosed for lost circulation control. U.S. Pat. No. 2,836,555 describes bentonite encapsulated within a polymeric coating having a tiny hole drilled therethrough. When the encapsulated bentonite is pumped down the wellbore, water will seep through the hole in the encapsulation causing the bentonite to swell and ultimately rupture the coating.

Another U.S. Pat. No. 4,036,301 describes an encapsulated material useful in cementing a well, wherein a cement accelerator is encapsulated in a waxy material and placed within a highly retarded cement slurry. The cement slurry is pumped into the well with the encapsulated accelerator. After proper placement of the cement, circulation is decreased so that the temperature of the cement fluid approaches the bottom hole temperature of the well and melts the encapsulated material, freeing the accelerator which sets the cement.

U.S. Pat. No. 4,362,566 discloses an additional use of encapsulated materials. The patent suggests encapsulating one component of a two or more component adhesive or cement mixture so that the adhesive or cement will not set until the encapsulated component is freed from its reaction-preventive casing.

SUMMARY OF THE INVENTION

The invention is a novel drilling fluid additive for reducing lost circulation in wellbores. The lost circulation additive is a highly water absorbent polymer encapsulated by a reaction-preventive protective casing to prevent the polymer from absorbing water and substantially increasing in size in the formation and borehole until it is desired to breach the casing.

The reaction-preventive protective casing may be a film which will dissolve after a desired time of residence in the borehole or a film or waxy substance which will dissolve or melt at a desired temperature in the borehole. Once the casing around the polymer is dissolved, melted or breached in some manner, the polymer will be released to absorb water in the formation or the borehole, causing a drastic increase in polymer size. Thus, fissures and pores through which drilling fluid was being lost will be substantially closed by the now expanded polymer. If the polymer is released in a clay based drilling fluid environment, a highly viscous, non-flowing mass will be formed with the expanded polymer and clay.

A method for employing the invention drilling fluid additive and reducing lost circulation is also disclosed. The encapsulated water absorbent polymer is placed in the drilling fluid and circulated in the wellbore. Fractures and large pores which are responsible for lost circulation of drilling fluids will claim additional drilling fluid including the encapsulated polymer. Once the encapsulated polymer has been circulated throughout the well, circulation of the drilling fluid is stopped. Once circulation has ceased, the temperature of the drilling fluid will rise and approach the formation temperature. The film or waxy substance encapsulating the highly water absorbent polymer will melt, releasing the polymer to absorb water and producing an expanded material which will seal off fractures and large pores. At this time, circulation of the drilling fluid is resumed to flush all residue from the wellbore. The highly expanded polymer in the pores and fractures will remain in the formation, blocking these avenues of lost circulation.

DETAILED DESCRIPTION

Drilling fluids are formulated to intentionally plug porous formations during drilling in order to stabilize the borehole and to control fluid loss. However, formations are frequently encountered that are so porous as to increase the loss of drilling fluids beyond an acceptable limit despite the use of lost circulation additives. Furthermore, a borehole may penetrate a fracture in the formation through which most of the drilling fluid may be lost.

In order to close off large pores and fractures which drain drilling fluid from the borehole, it is necessary to accurately place the lost circulation material at the correct locations and be able to clean up the wellbore after treatment is completed. The beauty of the present invention is that the encapsulated polymer can be placed at just the right spots to close off the pores and fractures which drain drilling fluid from the borehole. Because of the mechanics of the process, the unneeded polymer can be easily circulated out of the hole.

Any polymer which will significantly increase in size after water absorption may be encapsulated and used as the lost circulation additive of the present invention. Polymers which absorb hydrocarbons may also be encapsulated for use in the invention provided that the polymers also absorb water and increase in size upon water absorption. A class of polymers known as superabsorbent polymers perform very well.

Superabsorbent polymers absorb many times their own weight in water, causing the polymer volume to drastically expand. Several of these highly water absorbent polymers preferred for encapsulation are: alkali metal polyacrylates including J-500 and J-550, trademarked sodium polyacrylate polymers sold by Grain Processing Co.; A-100, a trademarked starch graft copolymer of polyacrylic acid and polyacrylamide sold by Grain Processing Co.; A-400, a trademarked polyacrylamidecosodium acrylate sold by Grain Processing Co.; and B-200, a trademarked potassium salt of A-400 sold by Grain Processing Co.

The amount of water these superabsorbent polymer will absorb is astounding. The J-500 polymer will absorb 375 ml of water per gram of J-500 polymer. The A-100 polymer will suck up 140 ml of water per gram of polymer. However, salt water has an adverse effect on water absorption. The addition of 0.4% NaCl to water will decrease the absorption of A-100 to 55 ml of water per gram of A-100 and decrease absorption of J-500 from 375 ml to 100 ml of water per gram of J-500.

Another group of water absorbent polymers which perform well in the invention are prepared by polymerizing one or more of the acids from the group consisting of acrylic acid and methacrylate acid in the presence of polyvinyl alcohol, neutralizing the polymer, and heat treating the polymer at about 50° C. to about 150° C. These polymers may also be cross-linked by carrying out the polymerization in the presence of a cross-linking agent. The hydrophilic gel polymers prepared according to this method are disclosed in U.S. Pat. No. 4,320,040, the disclosure of which is incorporated herein by reference. The same patent also discloses the use of saponified starch-acrylonitrile graft copolymers. All of these polymers expand substantially in size upon water absorption and absorb from two to eight times their weight in water.

Water absorbent polymers which may also be encapsulated are saponified copolymers of a vinyl ester and a compound selected from the group consisting of ethylenically unsaturated carboxylic acids and derivatives of ethylenically unsaturated carboxylic acids. U.S. Pat. No. 4,124,748, the disclosure of which is incorporated herein by reference, states that these copolymers may be cross-linked by polymerizing in the presence of a cross-linking agent. The cross-linking agent may include polyallyl compounds such as diaalyl phthalate, diallyl maleate, diallyl terephthalate, triallyl cyanurate or triallyl phosphate; polyvinyl compounds such as divinyl benzene, N,N'-methylene-bis-acrylamide, ethylene glycol diacrylate, ethylene glycol dimethacrylate, or glycerine trimethacrylate; allyl acrylate and allyl methacrylate. As the degree of cross-linking is increased with an increase in the amount of cross-linking agent, the water absorbing ability decreases. Thus, only a moderate amount of cross-linking is desired. These polymers increase significantly in size when absorbing as much as ten times their own weight in water. Furthermore, their gel formation ability is stable in a hydrated state for a long period of time.

U.S. Pat. No. 3,878,175, the disclosure of which is incorporated herein by reference, describes highly water absorbent and oil absorbent spongy polymers which can be encapsulated for use in the present invention. The highly absorbent copolymers are prepared by heating a solution in a hydrophobic liquid diluent of a mixture consisting essentially of from about 30 to about 90% by weight of a heterocyclic N-vinyl monomer containing a carbonyl functionality adjacent to the nitrogen in its heterocyclic moiety, about 10 to about 70% by weight of a comonomer selected from the class of vinyl esters and acrylate esters, about 0 to about 30% by weight of acrylamide or methacrylamide, and from about 0.5 to about 12% by weight, based on the total weight of the comonomer mixture of said heterocyclic N-vinyl monomer and said ester of a polyethylene glycol dimethacrylate as cross-linking agent, said heating conducted in the absence of atmospheric oxygen at a temperature ranging from ambient to about 60° C. for a period of time sufficient to yield a slightly gelled mass, followed by continued heating in an inert atmosphere to a temperature of about 100° C. for a period of about 1 to about 3 hours. Such spongy polymers readily swell upon immersion in water or organic substances to a water content of about 30 to 95%.

Natural and synthetic rubbers, which also swell upon water absorption may be employed in the present invention. Of course, other compounds which absorb water and expand in size which are not mentioned herein, may also be encapsulated to control lost circulation in aqueous drilling fluids. Another possible option is to use two or more polymers, each encapsulated separately, which will react with each other to form a stronger block of the lost circulation zone. If the polymer is structurally weak, a substrate may be used to help support the polymer.

The invention is applicable to aqueous drilling fluids which contain clays and is not applicable to oil based drilling fluids. The mud should have a pH of about 7 to about 8.5. Most clay-water systems with no supplemental treatment fall within this pH range because of the natural buffering effect of the clays.

Different types of reaction-preventive protective casings can be employed to encapsulate the highly water absorbent polymer and prevent it from reacting with clays in the borehole until the desired time. The casing may be a film which will dissolve after a desired time of residence in the borehole, releasing the polymer. An example is a partially water soluble casing which will take a measured time to dissolve, said time be sufficiently long to permit the encapsulated polymer to be circulated in the borehole and lost to the formation pores and fractures desired to be sealed off.

A second possibility is a film casing which will dissolve at desired temperatures, releasing the polymer so it may absorb the water in the mud. It is quite easy to raise the temperature of the mud environment in the drilling hole by slowing down or stopping mud circulation. Once circulation has ceased, the temperature of the formation will heat the drilling fluid constantly until the drilling fluid reaches formation temperature.

A third type of reaction-preventive protective casing is a waxy substance such as a petroleum derived wax which is selected so that its melting point is below the temperature of the underground formation, but above the bottom hole circulating temperature of the drilling fluid within the borehole. With a wax casing around the polymer, the encapsulated polymer can be circulated in the borehole until sufficient fluid has been lost to fractures and pores that it is desired to seal off. At that time, circulation can be stopped, permitting the temperature of the drilling fluid to rise to formation temperature. The increase in temperature of the drilling fluid will melt the waxy casing, releasing the polymer to expand by absorbing water. Petroleum derived paraffinic waxes having a melting point between about 100° F. and about 450° F. are preferred. The wax casings can be selected so that the invention additive will work at different formation temperatures in different wellbores.

Waxes normally melt over a range of temperatures. Thus, it is necessary to select a wax casing for the specific range of temperatures which will be encountered when practicing the invention in a particular wellbore. A hydrocarbon formation along the Gulf Coast may have a formation temperature of 248° F. which will heat up a 90° F. drilling fluid to a temperature of about 210° F. at the bottom of a 16,000 foot hole while circulating mud. This assumes a temperature gradent of 1.1° F. per hundred feet of well depth. Thus, it is necessary to have a film casing or a wax casing which will dissolve somewhere between the temperatures of 210° F. and 248° F.

Since it is preferred to have some margin of safety over the bottom hole circulation temperature of 210° F., it is preferred to select a wax or film casing which will dissolve within the temperature range of about 220° F. to about 247° F. With such a reaction-preventive protective casing, the water absorbent polymer will not be released for water absorption until mud circulation is ceased and the formation has had some time to heat up the drilling fluid to near the formation temperature of 248° F. Since it is undesirable to have the protective casing melt or dissolve before the encapsulated polymer is spotted at the right location, the protective casing should be designed with a melting point close to the formation temperature. It is also preferred to have the polymer released for reaction in the well within about 4 to 6 hours to allow sufficient time for the polymer to be placed within the loss zone.

The reaction-preventive casing must be substantially chemically inert to the encapsulated polymer and to the external medium around it. The casing should be resistant to diffusion in either direction, somewhat resistant to breakage from mechanical forces, and generally stable through temperature variations. Additionally, the casing must dissolve or melt at the proper time.

The above described properties are general properties and are subject to exceptions. If a reaction-preventive protective casing is employed which will dissolve after a given period of time in a medium to release the water absorbent polymer, preferably at least several hours, the protective casing will not be chemically inert to the external medium containing it. Protective casings are also employed in the pharmaceutical industry which permit limited diffusion of the encased material through the protective encapsulation. Another alternate embodiment relies on designing the casing to allow water diffusion through the casing to the polymer at a carefully controlled rate. After a sufficient time, the polymer will have absorbed enough water through the casing to expand and rupture the casing. Stability of temperature variation is also important since it may be necessary for the encapsulated polymer to go from an 80° F. temperature to about a 200° F.–350° F. temperature without releasing the polymer.

The capsules must also be able to resist substantial physical and mechanical forces placed on the protective casings without breaking. The encapsulation must remain sufficiently intact during the pumping and circulation process so that a significant amount of water absorbent polymer is not released into the drilling fluid before the desired time. The shearing forces placed on the casings may be substantial during mud circulation. Additionally, the protective casings must be able to survive storage, wherein capsule breakage may occur as a result of the weight of the encapsulated polymer stored in barrels and tanks.

For ease of encapsulation, spherical shaped particles are generally preferred for most encapsulation processes. However, a spherical shape is not crucial for some coating processes. Furthermore, a spherical shape is stronger structurally than other shapes, and is more likely to survive unbroken in storage and mud circulation.

The preferred encapsulating materials of the invention are organic waxes, especially petroleum derived paraffinic waxes. The organic waxes include organic esters, higher fatty acids and alcohols, and their mixtures, petroleum paraffinic waxes, synthetic waxes such as acrylic and vinyl polymers, polyolefins, and acrylic, olefinic or vinyl modified natural waxes and their mixtures. Preferred encapsulation materials are petroleum-derived waxes alone or in combination with vinyl resins, such as copolymers of ethylene and vinyl acetate, which provide superior strength and abrasion resistance.

The encapsulation process can be one of many methods well known in the art, such as spray coating, condensation, electrostatic coating, and solvent deposition. If a wax casing is employed which will melt at a desired temperature within the borehole, it is not even necessary that the casing be of a uniform thickness. The casing need not completely encapsulate the polymer, provided that polymer outside of the casing is removed or neutralized by water absorption or some other method prior to placing the encapsulated polymer within the drilling fluid. U.S. Pat. Nos. 3,971,852; 4,036,301; and 4,362,566 describe several methods of encapsulating materials. These patents, U.S. Pat. Nos. 3,971,852; 4,036,301; and 4,362,566 are herein incorporated by reference.

One method of encapsulating a highly water absorbent polymer with a waxy substance to form the invention lost circulation additive is to mix the polymer with a melted waxy substance until a uniform mixture is obtained. The mixture is then solidified and sheared to form relatively small particles. After shearing, the particles are placed in a bath to remove and neutralize any exposed polymer. Some encapsulation methods such as spray drying may permit simultaneous cooling and shearing of the polymer and wax mixture to form relatively small particles.

The encapsulated particles may be sized over a wide range. The size of the passages through the circulating jets in the drill bit is the absolute maximum particle size. However, the encapsulated particles should be of a small enough size so as to be able to enter the formation through fissures, small fractures and large pores. A preferred range of particle size is about 0.1 microns to 5 millimeters. It is believed that the smaller the encapsulated particle size, the more expensive the encapsulated additive would be, unless the additive was encapsulated by wax as noted above. With such a wax encapsulation, there should be no significant cost difference between large and small particles. It is believed that a larger particle size would result in a stronger blockage of a lost circulation zone such as a large fracture. The particles should be sized according to the properties of the formation and the lost circulation zone.

The invention also includes a method for reducing the lost circulation of drilling fluids in a borehole by employing the encapsulated water absorbent polymer. The method steps are, of course, dependent upon the particular type of encapsulation employed. If a wax with the desired melting point range encapsulates the polymer, the encapsulated polymer is circulated through the borehole in the drilling fluid until the encapsulated polymer is properly spotted. The circulation of the drilling fluid is stopped for a sufficient time to allow the temperature of the drilling fluid to be raised above the melting point of the wax casings. The wax melts, releasing the polymer to absorb water and expand, reducing lost circulation of drilling fluid to thieving zones and fissures. Circulation is then resumed to clear the borehole of undesired compounds.

This embodiment of the invention is particularly effective for closing off fractures and large pores without clogging the borehole. This is because the underground formation heats up the drilling fluid in the borehole starting at the outside of the borehole and working towards the center of the borehole. Thus, the wax casings will dissolve on the outside of the borehole releasing the polymer to absorb water at a substantially faster rate than the wax casings will melt in the middle of the borehole. Substantial expansion of the polymer will occur in the formation outside of the borehole and on the edges of the borehole before significant polymer is released from its protective casing at the center of the borehole, permitting resumed circulation to clean out the borehole of undesired compounds. This is particularly true when the invention method is used to seal off fractures which the borehole has penetrated. Normally, the fractures are smaller than the wellbore so that the water absorbent polymer will be released in the fractures long before it is released in the borehole.

Even if substantial polymer is released in the borehole, no damage will occur. The drilling fluid containing the polymer can still be circulated out of the hole, leaving behind the highly expanded, trapped polymer in the formation. The drill stem can be raised after the treatment and then brought back down to flush and clean the expanded polymer from the hole. If an aqueous drilling mud is used to expand the polymer instead of a clay free water, the clay in the drilling fluid can set up with the expanded polymer to form an extremely viscous, non-flowing mass. This mass, however, can be washed out of the borehole.

The use of a small pill or slug of drilling fluid containing the lost circulation additive is the preferred means of delivery to a lost circulation zone. A slug of drilling fluid, containing as little as 100 gallons of drilling fluid with the encapsulated polymer, can be introduced into the wellbore. Once the encapsulated polymer slug is properly spotted at the lost circulation zone, the rams of the blowout preventer are closed and additional fluid is pumped into the well, forcing the encapsulated polymer slug into the lost circulation zone.

The encapsulated polymer should be added to the drilling fluid in an amount sufficient to seal off the lost circulation zone. Depending on the type of polymer, the encapsulation used, and the formation and lost circulation zone drilled through, the drilling fluid should contain about two to about 250 pounds of encapsulated polymer per barrel of drilling fluid, preferably located only in the small slug of drilling fluid targeted for the lost circulation zone.

If the polymer is set with a clay free water and it is desired to reverse the treatment, it is only necessary to pump salt water into the borehole. Upon contact with salt water the expanded polymer will break up and release most of its absorbed water. The formerly expanded polymer can then be washed out of the formation. The preferred superabsorbent polymers encapsulated for this invention absorb only one-fourth to one-third as much salt water as fresh water when the salt water concentration is 0.4% NaCl. Higher salt concentrations result in even less salt water absorption.

Usually, it is immediately apparent when a fracture is penetrated by the wellbore. The mud pressure will drop and less drilling fluid will be circulated back to the top of the hole. Large fractures can be responsible for draining off almost all of the drilling fluid. When this occurs, the encapsulated polymer should be placed in the drilling fluid and pumped down the hole. Sufficient drilling fluid containing the encapsulated polymer is circulated to insure that the fracture contains substantial amounts of the treated drilling fluid. Of course, the encapsulated polymer will accompany the drilling fluid into the fracture. Circulation is then stopped. After a period of time necessary for the wax casings to melt and release the water absorbent polymer, circulation is resumed. Drilling fluid pressure will shortly begin increasing and more mud will be circulated back to the surface of the well. The increase in pressure and mud returned to the surface is a strong indication that the invention has worked and the fracture is sealed. Circulation is then increased to clear the borehole of undesired compounds.

The following example will further illustrate the novel lost circulation additive and invention method of the present invention. This example is given by way of illustration and not as a limitation of a scope of the invention. Thus, it should be clearly understood that the invention additive and method may be varied to achieve similar results within the scope of the invention.

EXAMPLE

A $C_{27}$–$C_{28}$ petroleum based wax with a melting point of about 135°–150° F. was employed to encapsulate the trademarked A-400 polymer, a polyacrylamidecosodium acrylate, sold by Grain Processing Co. 10 grams of A-400 were added to 90 cc of melted wax. The melted wax and polymer was mixed thoroughly until a uniform mixture was obtained. This hot suspension was then poured into a blender containing cold tap water and the blender turned on. The mixture was solidified and thoroughly sheared at the same time to form small granules.

The solid wax/polymer mixture was removed and liquid was filtered off. The mixture was then washed with water to remove excess polymer. No expansion of the small granules was noted. Thus, only polymer outside of the wax coating absorbed polymer, and that polymer was washed off.

A drilling fluid was prepared by adding 25 grams of Aquagel to 350 cc of tap water. Aquagel is a trademarked clay, primarily montmorillonite, sold by N. L. Baroid, Inc. This gave the equivalent of a 25 pounds per barrel drilling fluid.

25 grams of the encapsulated polymer was then added to 350 ml of the gel/water mixture to yield the equivalent of 25 pounds of polymer per barrel of drilling fluid. No significant changes in the mud properties were noted after the addition of the encapsulated polymer.

The encapsulated polymer and drilling fluid mixture were then placed in an oven at 150° F. After two hours, the wax had melted and the polymer/bentonite/water mix had formed a semi-solid mass. The mass was extremely viscous and would not flow. This semi-solid mass, when formed in a zone of lost circulation, would be extremely effective in shutting off the zone.

Many other variations and modifications may be made in the concepts described above by those skilled in the art without departing from the concepts of the present invention. Accordingly, it should be clearly understood that the concepts in the description are illustrative only and are not intended as limitations on the scope of the invention.

What is claimed is:

1. A drilling fluid additive for reducing lost circulation of aqueous drilling fluids in a borehole penetrating an underground formation, comprising a water absorbent polymer which expands upon absorbing water, said polymer encapsulated by a waxy substance having a melting point below the temperature of the underground formation and above the bottom hole circulating temperature of the drilling fluid within the borehole.

2. The drilling fluid additive of claim 1, wherein the water absorbent polymer is an alkali metal salt of a polyacrylate.

3. The drilling fluid additive of claim 1, wherein the water absorbent polymer is a starch graft copolymer of polyacrylic acid and polyacrylamide.

4. The drilling fluid additive of claim 1, wherein the water absorbent polymer is a polyacrylamidecosodium acrylate.

5. The drilling fluid additive of claim 1, wherein the water absorbent polymer is polyacrylamidecopotassium acrylate.

6. The drilling fluid additive of claim 1, wherein the water absorbent polymer is prepared by polymerizing one or more of the acids from the group consisting of acrylic acid and methacrylic acid in the presence of polyvinyl alcohol, neutralizing the polymer, and heat treating the polymer at about 50° C. to about 150° C.

7. The drilling fluid additive of claim 1, wherein the water absorbent polymer is a saponified product of a starch-acrylonitrile graft copolymer.

8. The drilling fluid additive of claim 1, wherein the water absorbent polymer is a saponified copolymer of a vinyl ester and a compound selected from the group consisting of ethylenically unsaturated carboxylic acids and derivatives of ethylenically unsaturated carboxylic acids.

9. The drilling fluid additive of claim 8, wherein the copolymer is a cross-linked copolymer obtained by polymerizing in the presence of a cross-linking agent selected from a group consisting of a cross-linking agent selected from the group consisting of diaalyl phthalate, diallyl maleate, diallyl terephthalate, triallyl cyanurate, triallyl phosphate, divinyl benzene, N,N'-methylene-bis-acrylamide, ethylene glycol diacrylate, ethylene glycol dimethacrylate, glycerine trimethacrylate, allyl acrylate and allyl methacrylate.

10. The drilling fluid additive of claim 1, wherein the water absorbent polymer is prepared by heating a solution in a hydrophobic liquid diluent of a mixture consisting essentially of from about 30 to about 90% by weight of a heterocyclic N-vinyl monomer containing a carbonyl functionality adjacent to the nitrogen in a heterocyclic moiety, about 10 to about 70% by weight of a comonomer selected from the class of vinyl esters and acrylate esters, about 0 to about 30% by weight of acrylamide or methacrylamide, and from about 0.5 to about 12% by weight, based on the total weight of the comonomer mixture of said heterocyclic N-vinyl monomer and said ester of a polyethylene glycol dimethacrylate as cross-linking agent, said heating conducted in the absence of atmospheric oxygen at a temperature ranging from ambient to about 60° C. for a period of time sufficient to yield a slightly gelled mass, followed by continued heating in an inert atmosphere to a temperature of about 100° C. for a period of about 1 to about 3 hours to yield an opaque self supporting spongy mass.

11. The drilling fluid additive of claim 1, wherein the water absorbent polymer is selected from the group consisting of natural rubbers and synthetic rubbers.

12. The drilling fluid additive of claim 1 wherein the encapsulated polymer is sized between about 0.1 microns and about 5 millimeters.

13. The drilling fluid additive of claim 1, wherein the water absorbent polymer is encapsulated by:
mixing the polymer with a melted waxy substance until a uniform mixture is obtained;
solidifying the mixture;
shearing the mixture to form relatively small particles; and
washing exposed polymer off the surface of the small particles.

14. The drilling fluid additive of claim 1, wherein the water absorbent polymer is encapsulated by:
mixing the polymer with a melted waxy substance until a uniform mixture is obtained;
simultaneously cooling and shearing the mixture to form relatively small particles; and
washing exposed polymer off the surface of the small particles.

15. The drilling fluid additive of claim 1, wherein the waxy substance is an organic wax.

16. The drilling fluid additive of claim 15, wherein the organic wax is a petroleum derived paraffinic wax.

17. The drilling fluid additive of claim 1, wherein the waxy substance has a melting point between about 100° F. and about 450° F.

18. A method of reducing lost circulation of aqueous drilling fluids in a borehole penetrating an underground formation, comprising:
adding a water absorbent polymer which expands upon absorbing water to a slug of drilling fluid, said polymer encapsulated with a waxy substance having a melting point below the temperature of the formation and above the bottom hole circulating temperature of the drilling fluid within the borehole, said polymer added in a quantity of about two to about 250 pounds of encapsulated polymer per barrel of aqueous drilling fluid;
spotting the slug of drilling fluid and polymer within a lost circulation zone;
stopping the circulation of drilling fluid for a sufficient time to allow the temperature of the drilling fluid to rise above the melting point of the waxy substance, permitting the encapsulated polymer to be released from its waxy encapsulation and expand to close off the lost circulation zone; and
resuming circulation to clear the borehole of undesired compounds.

* * * * *